(12) United States Patent
Papanastasiou

(10) Patent No.: US 10,763,097 B2
(45) Date of Patent: Sep. 1, 2020

(54) CONTROL OF IONS

(71) Applicant: FASMATECH SCIENCE & TECHNOLOGY LTD., Oxford (GB)

(72) Inventor: Dimitris Papanastasiou, Athens (GR)

(73) Assignee: FASMATECH SCIENCE & TECHNOLOGY LTD., Oxford (GB)

( * ) Notice: Subject to any disclaimer, the term of this patent is extended or adjusted under 35 U.S.C. 154(b) by 0 days.

(21) Appl. No.: 16/411,079

(22) Filed: May 13, 2019

(65) Prior Publication Data

US 2019/0355568 A1  Nov. 21, 2019

(30) Foreign Application Priority Data

May 15, 2018 (GB) .................................. 1807900.4

(51) Int. Cl.
*H01J 49/36* (2006.01)
*G01N 27/62* (2006.01)
*H01J 49/00* (2006.01)

(52) U.S. Cl.
CPC ............ *H01J 49/36* (2013.01); *G01N 27/622* (2013.01); *H01J 49/0031* (2013.01)

(58) Field of Classification Search
CPC ..... H01J 49/36; H01J 49/0031; G01N 27/622
USPC .......................... 250/281, 282, 290, 291, 292
See application file for complete search history.

(56) References Cited

U.S. PATENT DOCUMENTS

| 2002/0070338 | A1 | 6/2002 | Loboda | |
| 2011/0121170 | A1 | 5/2011 | Park | |
| 2012/0256083 | A1 | 10/2012 | Kovtoun | |
| 2013/0068942 | A1* | 3/2013 | Verenchikov | H01J 49/401 250/282 |
| 2014/0103206 | A1* | 4/2014 | Mukaibatake | H01J 49/062 250/288 |
| 2015/0069254 | A1* | 3/2015 | Fernandez | H01J 49/025 250/389 |
| 2015/0185190 | A1* | 7/2015 | Zhang | G01N 27/64 250/288 |
| 2019/0250167 | A1* | 8/2019 | Fernandez Lima | H01J 49/004 |

OTHER PUBLICATIONS

Liulin Deng et al., Ion Mobility Separations of Isomers based upon Long Path Length Structures for Lossless Ion Manipulations Combined with Mass Spectrometry, Chemistry Select Journal, 2016, 1, pp. 2396-2399, DOI:10.1002/slct.201600460, Wiley-VCH Verlag GmbH & Co. KGaA, Weinheim, Germany.

(Continued)

*Primary Examiner* — Nicole M Ippolito
(74) *Attorney, Agent, or Firm* — Franco S. DeLiguori; DP IP Group

(57) ABSTRACT

A mass spectrometer for analyzing fragment ions includes an ion source, an ion mobility spectrometer, and a system of electrodes. The ion source is configured to produce fragment ions. The ion mobility spectrometer is configured to receive fragment ions produced by the ion source and to separate at least a fraction of the received fragment ions according to their ion mobility into mobility-separated fragment ions. The system of electrodes is configured to receive DC electrical potentials to transfer at least a fraction of the mobility-separated fragment ions to a mass analyzer for generating a mass-to-charge (m/z) spectrum exhibiting reduced spectral complexity.

17 Claims, 7 Drawing Sheets

(56) References Cited

OTHER PUBLICATIONS

Ahed M. Hamid et al., Characterization of applied fields for ion mobility separations in traveling wave based structures for lossless ion manipulations (SLIM), Internal Journal of Mass Spectrometry, 2018, pp. 8-13, 430, Elsevier B.V., Richland, WA, US.

* cited by examiner

CONTROL OF IONS

BACKGROUND

Field

The present invention relates generally to mass spectrometers, and more particularly to mass spectrometers including drift cells for the analysis and separation of ions based on ion mobility.

Background Information

Spectral congestion in top down and native mass spectrometry analysis is a major drawback that hinders efficient data interpretation. This occurs when several (or many) different fragment ions in a mass spectrometry measurement possess comparable mass-to-charge ratios (m/z). The isotopic distributions for the different fragment ions with the same m/z will overlap when viewed on a m/z spectral graph and cannot be distinguished one from another.

SUMMARY

At its most general, the invention is to use differences in the ion mobility amongst a plurality of different ion species within an ion sample having comparable m/z, to spatially separate the different ion species according to their ion mobility. Once spatially separated, the individual ion species may be individually and separately trapped, moved and controlled as desired for analysis (e.g. to produce separate or fractional m/z spectra).

The velocity $v_d$ with which an ion drifts through a buffer gas in response to a uniform applied electric field E, is determined by ion mobility K of the ion in the form: $v_d=KE$. The ion mobility can be calculated via the Mason-Schamp equation:

$$K = \text{const.}[z/\sqrt{\mu}]$$

Here z is the ion charge and $\mu$ is the reduced mass of the ion ($m_1$) and the drift gas molecules ($m_2$):

$$\mu = \frac{m_1 m_2}{m_1 + m_2}$$

The constant term "const." is determined by the drift gas number density, the drift gas temperature, and the collision cross section between the ion and the drift gas molecules. Thus, ion mobility differs between ions of the same mass-to-charge ratio.

In so far, different versions of ion mobility spectrometers combined with mass spectrometry have been disclosed and are utilized to separate or disperse precursor ions in mobility space. Example devices are described in US 2011/0121170 A1; US 2002/0070338 A1; and US 2012/0256083 A1. In such devices the fragmentation cell is disposed downstream from the ion mobility spectrometer, such that the ion mobility spectrometer does not receive fragment ions and any fragment ions generated from precursor ions in the gas phase are formed after the ion mobility separation step is performed on un-fragmented ions. The inventors have realized that ion mobility technology can be employed to distinguish between different ions having the same mass-to-charge ratio, to separate or disperse fragment ions in mobility space and to reduce congestion of complex fragmentation (m/z) spectra, particularly, complex fragmentation spectra produced by mass analysis of fragment ion populations produced in RF ion traps utilizing electron capture dissociation, photo-dissociation or other types of ion activation-dissociation methods applied in the analysis of intact macromolecular ions. Specifically, the invention is concerned with the simplification of complex fragmentation spectra produced in the analysis of intact proteins, polypeptide chains (top down and middle down) and native mass spectrometry including the analysis of protein complexes, protein-drug conjugates, and antibodies in a middle-down or top down approach, facilitating peak identification and precise peak annotation using both manual and automated data post-processing methods.

The invention may be implemented using an ion drift cell containing a buffer gas within which a homogeneous (e.g. DC) electrical field is applied to impose a drift force to ions in the drift cell in a direction along the longitudinal axis of the drift cell. The electrical field drives ions through the drift cell where they interact with the neutral molecules of the buffer gas contained within the drift cell. The buffer gas contained in the drift cell is most preferably a gas in an equilibrium state. That is to say, the buffer gas contained in the drift cell is preferably a non-flowing gas. The different species of ions are separated based on ion mobility. Different species of ions traverse different distances within the drift cell in a given time interval. The spatially separated ions may be trapped, stored or confined in separate respective locations axially along the drift cell and ejected from the drift cell separately, or simply transmitted through the cell, without trapping, for direct mass analysis.

The drift cell may be tubular e.g., with a series of ring-shaped electrodes arranged in a stack. Other drift cell designs can be used, for example a drift cell formed using separated, planar conductive plates or boards opposed/facing each other, e.g. two gold-plated printed circuit boards, for example, such as is described in Hamid et al, Int J Mass Spectrom, 430, 8, 2018 and Deng et al, ChemistrySelect, 1(10), 2396, 2016, the relevant disclosure of each which are incorporated herein by reference in their entirety.

The invention may provide a new method that utilizes a high performance ion mobility drift cell combined with an ion trap, preferably a radio-frequency (RF) ion trap, most preferably a segmented RF linear ion trap. Fragment ions, which in a typical top-down fragmentation experiment may comprise of >100 or even >1000 distinct isotopic distributions simultaneously confined in a RF field of an ion trap, and originating from one or more precursor ions mass selected in an ion trap or in a quadrupole mass filter, may be injected and separated inside a pressurized drift cell at pressures in the range of 0.1 mbar or higher (e.g. <15 mbar). Fragment ions will separate according to mass, shape and charge state. Fragment ions may be simply transmitted toward a mass analyzer or divided and stored in trapping regions of the drift cell provided by applying pulsed or switched DC fields superimposed on the drift electric field (E). The static DC gradient of the drift electric field (E) may be combined with the pulsed or switched DC electric fields to form discrete mobility-separated ion groups, which may be stored in trapping regions within the drift cell.

An RF field is preferably applied to the electrodes of the ion mobility spectrometer to store the mobility-separated ion groups in the trapping regions of the drift cell. The RF field may be generated by two anti-phase sinusoidal RF waveforms each applied to the odd and even numbered electrodes of the stack or system of electrodes of the drift cell, respectively. Reversing of the drift electric field (E), by reversing the static DC gradient applied across the drift cell may be implemented to move/transfer discrete mobility-separated ion groups separately into an ion trap and/or to a mass analyzer. Preferably an orbitrap or a time-of-flight (TOF) mass analyzer may be used for this purpose. The above-described fragment ion transfer method may be implemented in cycles, each being preferably of <200 ms per transferred ion group.

The apparatus and method according to the present invention may greatly reduce spectral density since ions with different charge states appearing at the same position in the m/z scale may now be spatially separated, and/or trapped and ultimately mass analyzed separately. The new method permits the simplification of complex m/z spectra and associated improvements in peak assignment to allow de-novo sequencing of proteins, for example.

The invention may provide an apparatus and/or method as set out in the accompanying claims herein.

In an aspect, the invention may provide a mass spectrometer comprising an ion trap for producing fragment ions, an ion mobility spectrometer for receiving and separating fragment ions (e.g. down-stream from the ion trap), and a mass analyzer for producing a m/z spectrum (e.g. of the fragment ions). The mass spectrometer may provide at least one region along the ion optical path of the mass spectrometer for storing at least a fraction of the mobility separated fragment ions. The mass spectrometer may provide a control system of electrodes, or a system of electrodes and associated DC potentials switched, or switchable, for transferring the selected fraction to a mass analyzer to create a m/z spectrum, where the generated m/z spectrum contains information from only a fraction of the initial population of the fragment ions (e.g. produced by the ion trap) to reduce spectral complexity. The ion trap, the ion mobility spectrometer and the mass analyzer units including all intermediate ion optical components for transferring ions between the separate units are all comprised of individual sets of electrodes collectively forming a system of electrodes for processing ions. Processing involves activating, fragmenting, separating and mass analyzing ions in a mass spectrometer that incorporates the unique features outlined in the present invention.

In another aspect, the invention may provide a mass spectrometer comprising an ion trap for fragmenting ions, an ion mobility spectrometer for receiving and separating fragment ions, and a mass analyzer for producing a m/z spectrum. The mass spectrometer may provide a series of trapping regions established toward the exit end of the ion mobility spectrometer and switched during the separation step for splitting fragment ions into separate groups or fractions. The mass spectrometer may provide a set of switches, e.g. floating to the level set by the drift electric field E of the ion mobility drift cell, for switching DC potentials applied to the ion mobility spectrometer to release separated groups of ions in consecutive steps to produce individual m/z spectra in each step of the process. RF signals must be applied to all electrodes forming the trapping regions in the drift cell. Preferably, electrodes are spaced apart by a gap of <1 mm and electrode pitch is preferably set to <1.5 mm. Desirably, the number of spectra produced in a single cycle equals the number of groups separated in the ion mobility spectrometer.

The mass spectrometer may be configured or arranged such that the switching of the DC potentials applied to the ion mobility cell also includes reversing the DC gradient established across the stack of electrodes. In yet another aspect, the invention may provide a method for separating fragment ions in an ion mobility spectrometer, the method comprising generating fragment ions in a RF linear ion trap (e.g. a quadrupole ion trap), injecting and separating ions inside a pressurized ion mobility cell, isolating or transmitting at least one group of fragment ions from the initial ion population of fragments, and transferring the at least one isolated or transmitted group of ions towards a mass analyzer to produce a m/z spectrum containing reduced information compared to the m/z spectrum that includes all fragment ions.

In an aspect of the invention, there is provided a mass spectrometer for receiving fragment ions from an ion source, comprising: an ion mobility spectrometer for receiving and separating fragment ions according to their ion mobility into mobility-separated fragment ions; at least one region along an ion optical path of the ion mobility spectrometer for storing at least a fraction of the mobility-separated fragment ions; a control system comprising a system of electrodes and configured for applying associated DC electrical potentials to the electrodes and for switching or changing at least one of the DC electrical potentials for transferring the stored fraction of the mobility-separated fragment ions to a mass analyzer for generating a m/z spectrum therefrom; wherein the generated m/z spectrum contains only a fraction of the initial population of the fragment ions received from said ion source, thereby to reduce spectral complexity and facilitate peak assignment and data interpretation using a variety of post processing methods.

The mass spectrometer may comprise an ion trap as said ion source for producing fragment ions. The mass spectrometer may comprise the mass analyzer for producing a m/z spectrum from said stored fraction of the mobility-separated fragment ions transferred to it by said control system. The control system may be arranged to apply to the ion mobility spectrometer a series of radio-frequency (RF), and DC electrical potentials for generating electric fields defining ion trapping regions disposed toward an exit end of the ion mobility spectrometer, for trapping the mobility-separated fragment ions thereat. The control system may be arranged to switch electrical potentials from amongst said series of electrical potentials, for separating, partitioning or splitting the mobility-separated fragment ions into spatially separate groups. The control system may be arranged for switching at least a portion of the DC electrical potentials applied to the ion mobility spectrometer to release said spatially separate groups of ions in temporally consecutive steps to permit said m/z spectra to be generated therefrom. The control system may comprise a set of switches arranged for switching said electrical potentials from amongst said series of electrical potentials. Switching and synchronization of all electrical potentials is performed by the control system, which includes the system of electrodes configured to guide, separate and/or trap and process ions in a mass spectrometer of the present invention. The control system also comprises a set of electronics units for generating RF, static and switched DC electrical potentials that are distributed and applied to the system of electrodes of the mass spectrometer apparatus.

In another aspect, the invention may provide a mass spectrometer comprising: an ion trap for fragmenting ions; an ion mobility spectrometer for receiving and separating fragment ions; a mass analyzer for producing a m/z spectrum; a series of RF and DC trapping regions established toward the exit end of the ion mobility spectrometer and switched during the separation step for splitting the fragment ions into separate groups; a set of switches for switching at least one of the DC potentials applied to the ion mobility spectrometer to release separated groups of ions in consecutive steps to produce a number of m/z spectra in each step;

where the number of spectra produced in a single cycle equals the number of groups separated in the ion mobility spectrometer.

The switching of the DC potentials applied to the ion mobility cell may also include reversing the DC gradient established across the stack of electrodes.

In yet a further aspect, the invention may provide a method for separating fragment ions in an ion mobility spectrometer, the method comprising: generating fragment ions in a RF linear ion trap; injecting and separating ions inside a pressurized ion mobility cell; isolating at least one group of fragment ions from the initial ion population of fragments; and transferring the at least one isolated group of ions towards a mass analyzer to produce a m/z spectrum containing reduced information compared to the m/z spectrum that includes all fragment ions.

DETAILED DESCRIPTION

Figure 1:
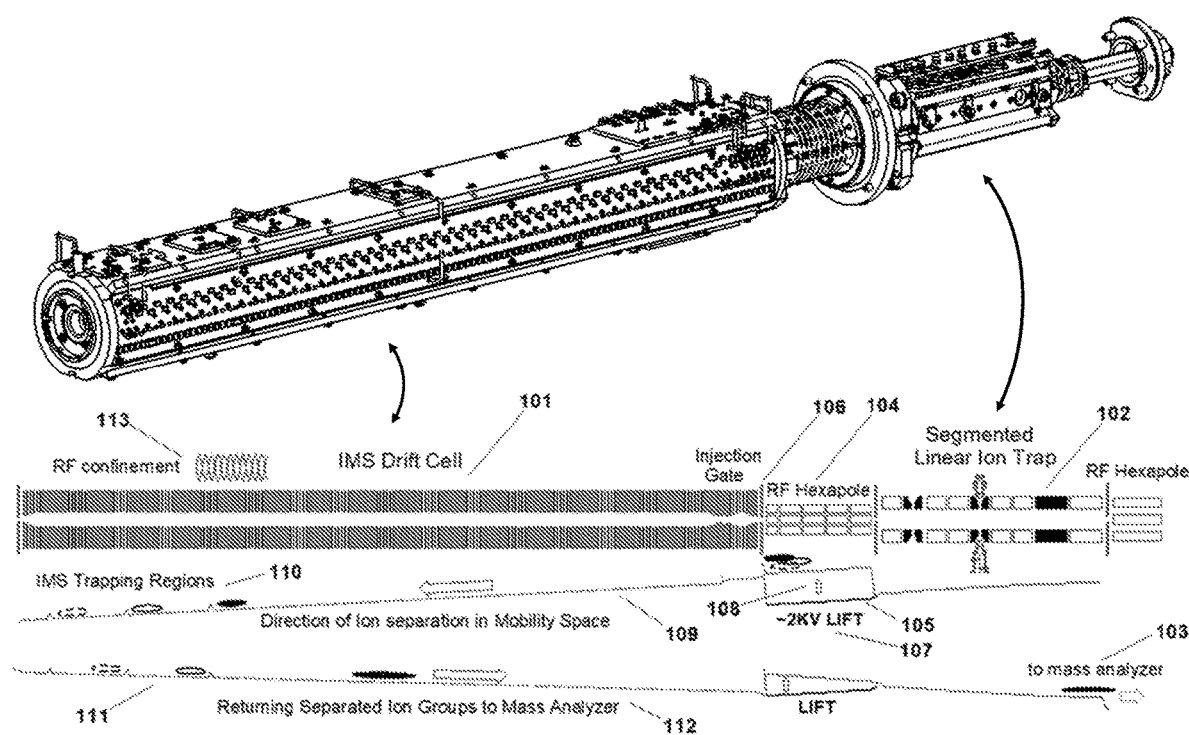
FIG. 1 shows a schematic diagram of an apparatus according to an embodiment of the invention, including a cross-sectional view of the apparatus and a schematic illustration of electric potentials (V) according to the voltage profiles applied along the ion optical axis or along the system of electrodes.

FIG. 1 shows an ion mobility drift cell (hereafter also referred to as ion mobility spectrometer—IMS) 101 connected to a RF linear ion trap 102 (e.g. a quadrupole ion trap), and used for receiving, separating and returning separated packets of ions into the a mass analyzer 103 which may be disposed upstream of the linear ion trap 102 for reducing spectral complexity and facilitating spectral interpretation with both automated and manual processing methods. Also shown are RF multipole (e.g. hexapole) ion guides 104 for transferring fragment ions from the segmented RF linear ion trap 102 to the ion mobility drift cell 101 and operated at an intermediate pressure to bridge the large operating pressure differences that may be established between the RF linear ion trap and the ion mobility cell. Fragment ions can be stored in the RF multipole ion guide 104 and gated into the ion mobility drift cell 101. Preferably, the RF multipole ion guide 104 is used to gate ions into the ion mobility drift cell and is segmented and arranged to apply a weak DC gradient 105 for forcing ions to accumulate near the exit-end of the device where thermalization may be performed, e.g. at $>10^{-3}$ mbar pressure. An additional voltage applied to a differential lens electrode 106, located between the ion mobility drift cell 101 and the RF multipole ion guide 104. This additional voltage can be switched to inject ions from the RF multipole ion guide 104 into the pressurized cell (~1 mbar) of the ion mobility drift cell 101. The RF multipole ion guide 104 is preferably operated in pulsed DC mode or switched DC mode 107, and ion potential energy is thereby raised, as denoted by the arrow 108, to the appropriate level prior to injection into the ion mobility drift cell 101. Most preferably, the pulsed high-voltage DC level 107 of the RF multipole ion guide 104 is reached simultaneously with the pulsed high-voltage DC level 109 of the ion mobility drift cell 101. Therefore, different ion optical components 101 and 104 disposed in different vacuum regions are pulsed simultaneously.

FIG. 1 also shows a schematic diagram of the pulsed or switched DC potential profile 109 created across the cell by the application of DC potentials to the electrodes of the mass spectrometer, individual trapping regions 110 for storing and separating ions and the ability to reverse the DC gradient 111 to return separated packets of fragment ions 112 towards the mass analyzer 103. An RF field 113 is preferably applied to the electrodes of the drift cell 101 to confine ions radially and minimize losses due to diffusion. The ion trap 102, the ion mobility spectrometer 101 and the mass analyzer 103 units including the RF hexapole ion guide 104 and all differential aperture lenses, for example lens 106, for transferring ions between the separate units are all comprised of individual sets of electrode(s) collectively forming a system of electrodes for processing ions.

Figure 2:
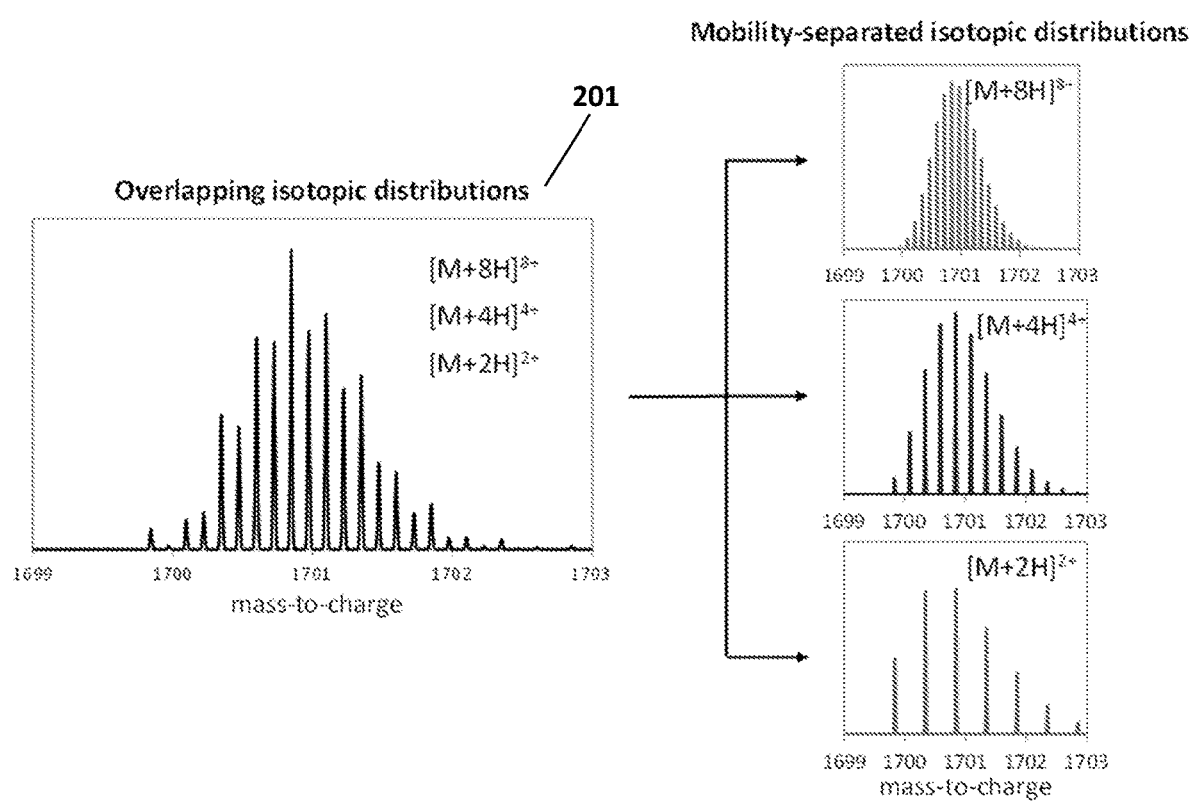
FIG. 2 shows a single mass-to-charge spectrum with overlapping isotopic distributions and fractional mass-to-charge spectra where separated isotopic distributions are produced by a mass analyzer of a mass spectrometer employing the apparatus of the present invention.

FIG. 2 shows an example of a m/z spectrum with three overlapping isotopic distributions of fragment ions 201 having different charge states, and the 2+ and 4+ charge state isotopic distributions buried beneath the 8+ distribution complicating peak assignment and identification. The ion mobility system will allow for separating the different charges states and generating individual spectra 202, 203 and 204, where each contains only one of the three original isotopic distributions, which would otherwise appear in the same m/z spectrum and would have been indistinguishable. Similarly, FIG. 1 shows the separation of three different ion groups, for example the different charge state fragment ions presented in FIG. 2, and sequential transfer of the separated groups to a mass analyzer for producing fractional m/z spectra with reduced (i.e. less 'cluttered' and more clear) information following trapping and sequential release.

It is emphasized that the mass analyzer can also be positioned beyond the drift cell and linear ion trap in the forward direction (i.e. left-hand side of FIG. 1), in which case, ions will be released in the forward direction and there will be no need to reverse the DC gradient or even trap the mobility separated fractions in different regions of the drift cell prior to mass analysis. A more detailed description of this preferred embodiment is provided with reference to FIG. 6.

Figure 3:
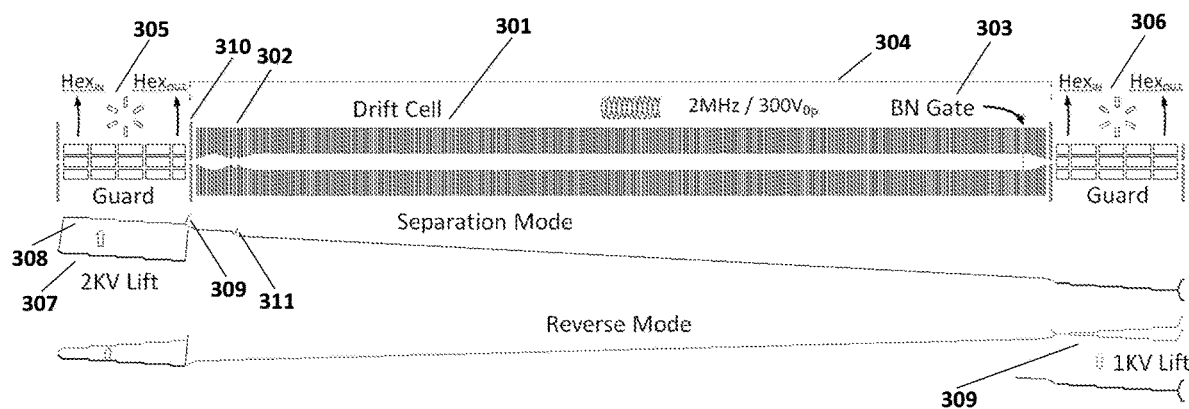
FIG. 3 shows a schematic diagram of the ion mobility cell according to an embodiment, designed with two guarding RF hexapoles for injecting and receiving ions to and from the cell respectively and also controlling ion potential energy during the course of an experiment.

FIG. 3 shows a linear ion mobility drift cell 301 with a wire-free injection gate 302 incorporated at the front end of the system and an additional Bradbury-Nielsen (BN) gate 303 installed at the back end of the cell for selecting a narrow mobility range prior to trapping or prior to mass measurement in the mass analyzer. The ion mobility drift cell 301 is enclosed in a pressurized chamber 304. Preferentially, the ion mobility drift cell 301 is differentially pumped by a mechanical vacuum pump and actively maintained at >0.1 mbar pressure, e.g. by admitting the buffer gas through a leak valve, for example. The buffer gas or drift gas where ions are pulled through by the application of an external electrical field is a gas in a state of equilibrium.

Two guarding hexapoles (e.g. RF hexapole ion guides) 305 and 306 are disposed on either side of the ion mobility drift cell 301 and operated at a pressure of e.g. <0.1 mbar, or preferably within a pressure range of >$10^{-3}$ mbar and <0.5 mbar. The entrance RF hexapole 305 is used for receiving the ions from an ion source or an ion trap, (e.g. preferably the ion trap platform such as is described in U.S. Pat. No. 9,978,578B2, the relevant disclosure of which is incorporated herein by reference in its entirety) and storing ions at a first potential energy level 307. Subsequently ion potential energy is lifted or raised to a second potential energy 308 level by fast switching of all DC voltages applied to the segments simultaneously. Ions are gently transferred (or gated) 309 through a differential aperture 310 into the ion mobility drift cell 301 and transferred to (e.g. and preferably re-trapped at) the injection gate region 302 (e.g. a wire-free injection gate, for example), where an additional voltage pulse, or a switched DC level 311 is applied to release ions and initiate the ion mobility separation step. Separated ions can be trapped in trapping regions as described in FIG. 1, or only a narrow mobility range can be transmitted beyond this point, either stored inside the pressurized cell, or transferred to the exit hexapole.

For example, ions may be stored inside the ion mobility drift cell 301 by switching at least two of the superimposed DC signals in a synchronized manner to select ions with a certain mobility range, or by using the BN gate 303 to select and transfer ions to the exit RF hexapole or to yet another trapping region within the mobility cell disposed further downstream from the BN gate. At least a portion of the mobility separated ions, e.g. whether trapped or transmitted through the ion mobility drift cell 301 for example, is subsequently transferred to a mass analyzer for mass analysis or back to the RF linear ion trap for further processing.

Ions introduced at the exit RF hexapole can be stored and their potential energy can be raised at an appropriate level 312 to facilitate transferring back to the linear ion trap or to a mass analyzer. Both the linear ion trap and the mass analyzer can be disposed either upstream or downstream from the ion mobility cell. Alternatively, the RF hexapole ion guide can be used as a simple transmission device.

Figure 4:
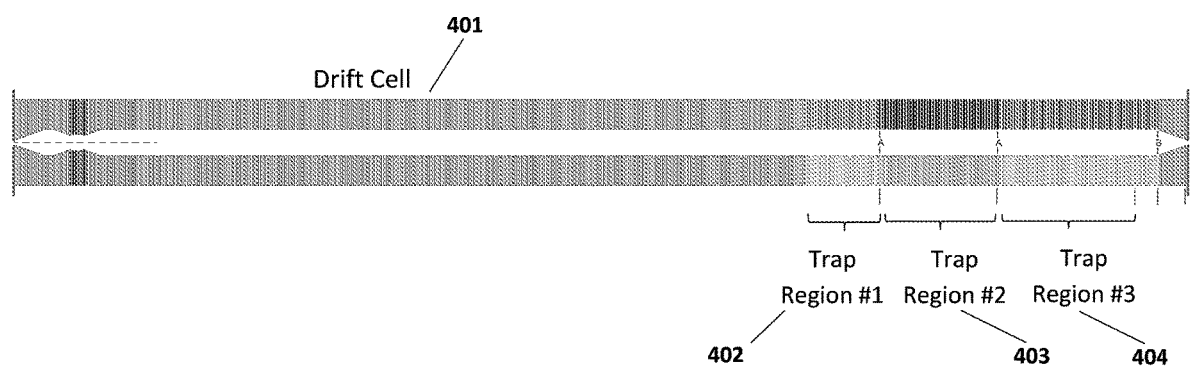
FIG. 4 shows a schematic diagram of the ion mobility cell according to an embodiment, designed with three trapping regions of different length to spread the information equally between trapping regions.

The switching and synchronization of all electrical potentials is performed by the control system, which includes the system of electrodes configured to guide, separate and/or trap the ions in the mass spectrometer and also the DC-RF signals applied to the electrodes of the mass spectrometer FIG. 4 shows the ion mobility drift cell 401 where the positions of the trapping regions inside the drift cell are highlighted 402, 403 and 404. In this preferred design the length of each of the trapping regions is optimized with the third trapping region designed with extended length to accommodate the faster mobility ions. The length of the trapping regions is optimized to disperse the information of a single m/z spectrum containing all fragment ions to multiple spectra, each of similar spectral density. Alternatively, a BN gate and preferably at least one trapping region utilizing at least one DC signal superimposed on the drift electric field E of the ion mobility drift cell is used to select a narrow mobility range, which is subsequently transmitted to the mass analyzer producing a single m/z spectrum with reduced complexity. The signals applied to drive the BN gate and/or the trapping regions within the drift cell are preferably scanned to cover the entire range of ion mobilities of interest producing sequential m/z spectra of reduced complexity.

In yet another mode of operation, and preferably in cases where very dense and highly complex fragmentation patterns are to be produced in a single cycle of a typical experiment, the ion mobility spectrometer disclosed herein is designed with extended length or produced in a cyclic or folded configuration to enhance mobility separation of the ion population. Separated fragment ion populations can be subsequently transmitted to the mass analyzer or stored in multiple trapping regions and finally separated fractions can be injected in a step wise manner without losses to the mass analyzer or the linear ion trap for further processing.

Figure 5:
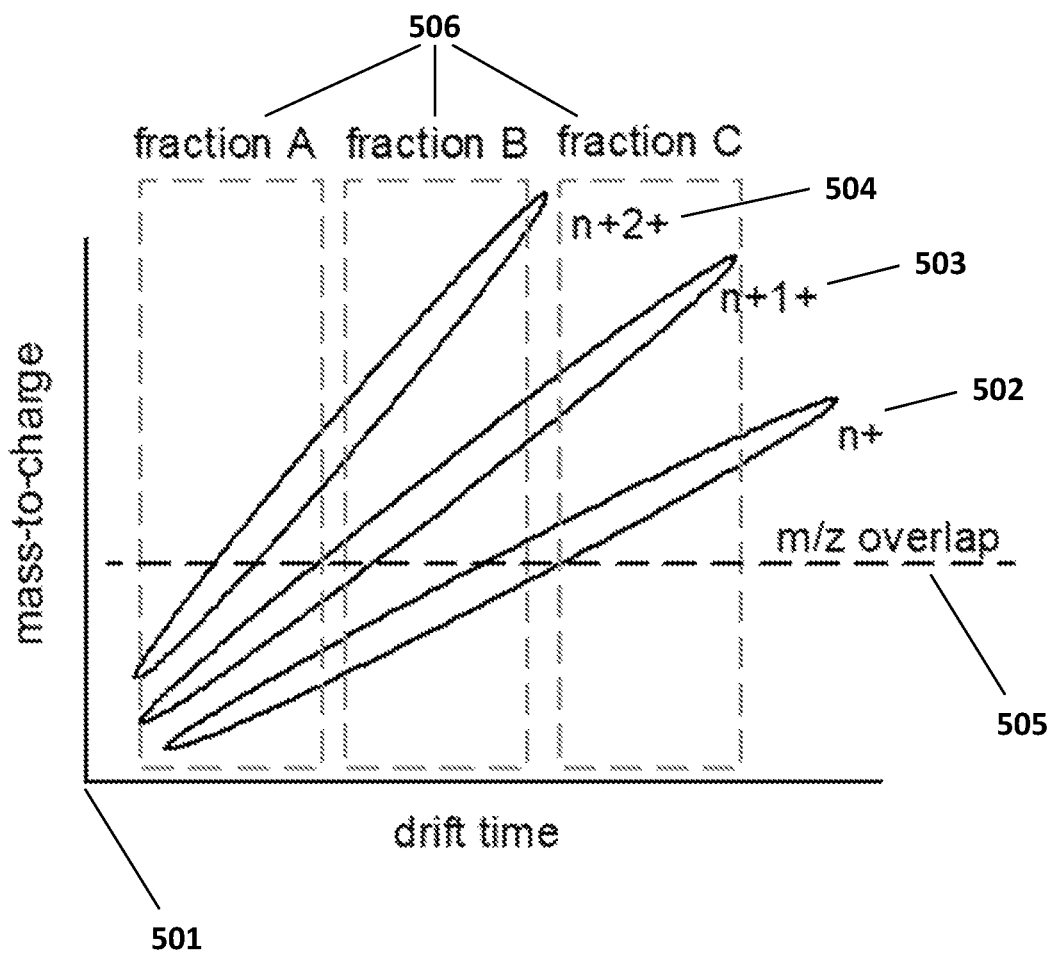
FIG. 5 shows a 2-dimensional (2D) representation of fragment ion separation in m/z—drift time scales highlighting the overlapping observed in the m/z axis for different charge state species and separation of fragments in three fractions to resolve spectral congestion.

FIG. 5 shows an example of a separation of a fragment ion population in two-dimensions (m/z and drift time) 501, highlighting the dispersion patterns for different charges states, n+ 502, (n+1)+ 503 and (n+2)+ 504 where n=1,2,3 and the overlap typically observed in the m/z scale 505. In this example, injection of ions in the drift cell disclosed here allows for separating the ion population in three fractions 506, and subsequently detecting these fractions independently. Spectral congestion is therefore significantly reduced. Consequently, the efficiency of automated peak processing is increased by reducing the number of false positive identifications while the confidence of the true positive fragments identified by algorithms developed for protein sequencing is considerably improved, especially de-novo sequencing algorithms. In FIG. 5, fractions A, B and C are separated in the ion mobility cell and released independently towards the mass analyzer. Consequently, the detection of the entire population is reduced by a factor of 3×.

In yet another preferred embodiment, a BN gate is used in transmission mode to select at least one desired fraction of the initial fragment ion population in order to resolve overlapping isotopic distributions of fragment ions. In this approach trapping is not performed. Desirably, the mass analyzer is disposed downstream from the drift cell, although an upstream arrangement is also envisaged with the DC gradient applied across the drift cell reversed immediately after the selection step performed with the BN gate or with the fast switching DC signals superimposed on the electric field E of the drift cell.

Figure 6:
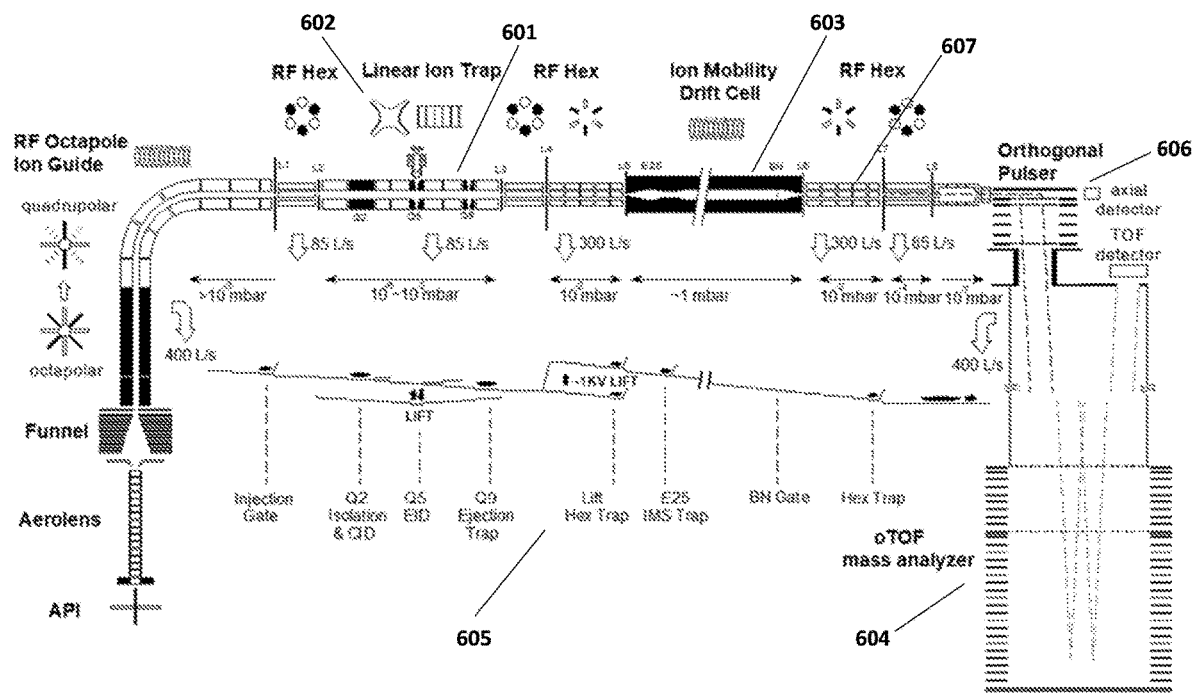
FIG. 6 shows a schematic diagram of a preferred embodiment of a mass spectrometer comprising a series of ion optical systems arranged with the following order, atmospheric pressure ionization source (API), transfer RF ion guides, RF linear quadrupole ion trap, ion mobility drift cell and orthogonal TOF mass analyzer.

FIG. 6 shows a preferred embodiment of the present invention comprised of a RF linear ion trap 601 with hyperbolic electrodes 602 and further segmented in the axial direction for fragmenting ions in different regions designed to apply different methods of ion activation-dissociation, an ion mobility drift cell 603 for separating or selectively transmitting fragment ions according to ion mobility and a TOF mass analyzer 604 disposed further downstream for producing m/z spectra.

The different regions where ions can be trapped are also highlighted using the axial DC profile and corresponding transitions 605 established across the different ion optical components (trapping regions within the drift cell are not shown). In this preferred configuration field reversal of the drift electric field E is exercised for redirecting mobility selected ions back to the RF linear ion trap 601 for further processing.

In another mode of operation, rich populations of fragment ions produced in any of the different trapping regions of the ion trap 601 are injected in the drift cell 603, separated and sampled continuously by an orthogonal pulser 606 of an orthogonal TOF analyzer 604 with the extraction voltage pulse applied at the highest possible repetition rate to produce a high quality ion mobility spectrum. No trapping in the ion mobility cell is exercised in this mode of operation. In yet another mode of operation, mobility separated ions are stored in the consecutive trapping regions of the drift cell 603, similarly to the examples disclosed with reference to FIG. 1 and FIG. 4, and ejected separately and in a sequential manner to the TOF analyzer 604 where the arrival time of the mobility separated fraction in the effective region of the orthogonal pulser of the TOF analyzer 604 is synchronized with the TOF extraction voltage pulse. Sequential storage of the different fractions of the fragment ion population at the RF hexapole trap 607 following the separation process in the drift cell 603 may also be desirable to enhance the duty cycle of the experiment. The RF hexapole trap or ion guide 607 at the exit of the ion mobility drift cell 603 is also operated in the pressure range of $>10^{-3}$ mbar and $<0.1$ mbar.

The control system of the mass spectrometer shown in FIG. 6 also comprises a set of electronics units for generating RF, static and switched DC electrical potentials that are distributed and applied to the electrodes of the mass spectrometer apparatus in a synchronized manner.

In yet another mode of operation, a narrow range in m/z can be isolated in the RF linear ion trap first and subsequently injected and separated in the ion mobility drift cell. This method allows for the simplification of the m/z spectrum prior to ion mobility separation. Concentrating in a highly congested region of the m/z spectrum only by injecting a narrow m/z band will enhance spectral interpretation further. Injection of selected mass ranges in the ion mobility spectrometer may include one or more fractions of the complete m/z spectrum.

Overall, separation in ion mobility space and detection of separated fractions will not only resolve overlapping isotopic distributions of different charge state, but it will also reduce chemical noise which interferes with sequence specific fragments that must be identified and assigned with high confidence. These hardware advancements are inherently connected with methods and algorithms developed to process such complex data sets in an automated manner. The identification of monoisotopic peaks in higher charge state fragments becomes particularly problematic, if not impossible, in congested m/z spectra. Fitting entire isotopic distributions is therefore highly advantageous, eliminating the need for performing m/z spectra deconvolution and avoiding substantial errors associated with such an approach.

The hardware solutions disclosed herein for reducing spectral complexity are also associated with advances in fragment ion matching algorithms. In particular, a new method is disclosed for peak assignment where theoretical isotopic distributions from a known peptide or protein sequence are calculated and superimposed to experimental m/z spectra. A score function is created by subtracting the theoretical from the experimental m/z spectrum. Preferably, an interpolation algorithm is applied to the theoretical isotopic distributions to match the m/z step values of the experimental spectrum. Least square differences of the matched theoretical and experimental m/z spectra are subsequently calculated (score values or calculated quantities are raised in the power of 2 prior to subtraction of the two spectra). Minimization of this quantity, the value of the score function, will allow excluding false positives more accurately whilst enhancing the number of true positive identifications. This method involves all isotopic peaks present in the mass spectrum and does not require deconvolution typically performed in existing peak assignment algorithms. The algorithm is preferably applied in a sequential manner across the m/z spectrum, that is, fitting of the theoretical isotopic distributions is performed for specific or selected windows in the m/z scale to accelerate processing, preferably starting from the lowest m/z values of interest. Entire spectra can be processed, starting from the low end to the high end in the m/z scale.

Figure 7:
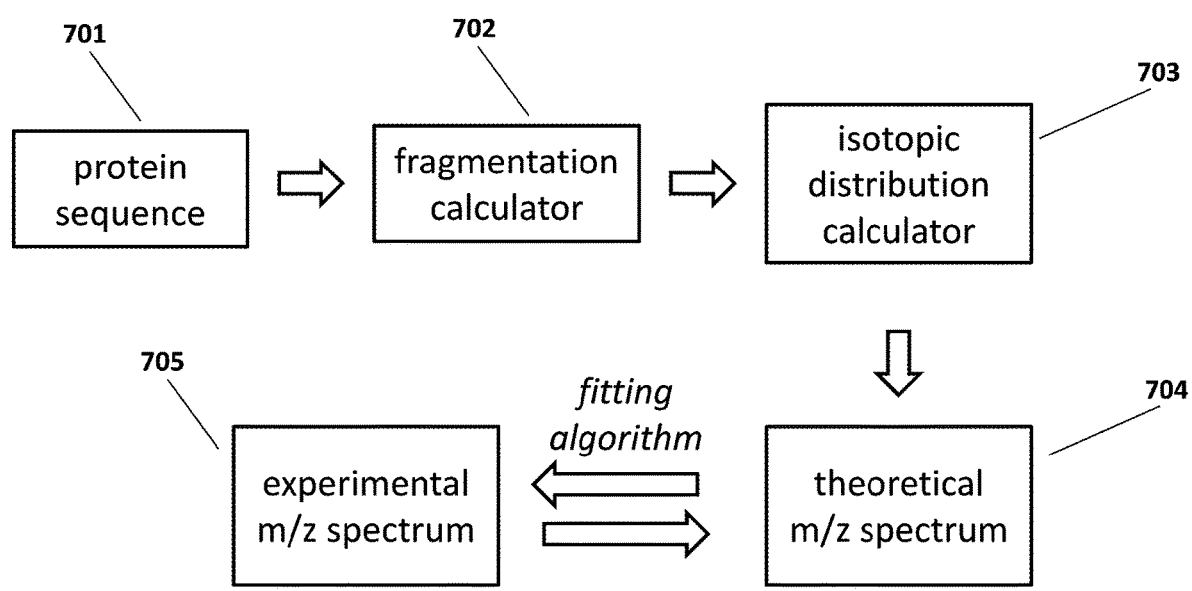
FIG. 7 shows a flow chart diagram for annotating fragment ions in a m/z spectrum with high confidence. For a given protein sequence, isotopic distributions of fragment ions are calculated and an algorithm is applied to fit these distributions to experimental m/z data.

FIG. 7 shows a flow chart diagram highlighting the key elements of the software algorithm disclosed herein for annotating fragment ion m/z spectra. A known protein sequence 701 is imported into a fragment calculator 702 producing a list of fragment ions, for example a list containing primary fragments, internal fragments and side chain losses, also providing the chemical formula for each of the fragments that is used to produce isotopic distributions using an isotopic distribution calculator 703. A theoretical spectrum can therefore be constructed 704 using the theoretical isotopic distribution calculator 703 which is subsequently matched to the experimental spectrum 705 using the methods described above.

De-novo sequencing algorithms can also be integrated with this method. Different sections of an unknown peptide of protein sequence can be ascertained by matching the m/z difference of isotopic distributions to particular amino acids (AA). Suggested AA sequences can then be aligned and subjected to the post-processing method disclosed with reference to FIG. 7. The same approach can be extended to lipids, DNA-RNA molecular ions and other biologically relevant species.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description of preferred embodiments and best mode of the invention known to the applicant at this time of filing the application has been presented and is intended for the purposes of illustration and description. It is not intended to be exhaustive or limit the invention to the precise form disclosed and many modifications and variations are possible in the light of the above teachings. The embodiments were chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out this invention, but that the invention will include all embodiments falling within the scope of the appended claims.

In one or more exemplary embodiments, the functions described may be implemented in hardware, software, firmware, or any combination thereof. If implemented in software, the functions may be stored on or transmitted over as one or more instructions or code on a computer readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or any other device or apparatus operating as a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mass spectrometer for analyzing fragment ions, the mass spectrometer comprising:
    a mass analyzer for generating a mass spectrum of fragment ions;
    an ion source for producing fragment ions;
    an ion mobility spectrometer for receiving fragment ions produced by the ion source and for separating at least a fraction of the received fragment ions according to their ion mobility into mobility-separated fragment ions; and
    a system of electrodes associated with the ion source and the ion mobility spectrometer and configured to receive DC electrical potentials to transfer at least a fraction of the mobility-separated fragment ions to the mass analyzer for generating a mass-to-charge (m/z) spectrum exhibiting reduced spectral complexity.

2. A mass spectrometer according to claim 1, wherein the system of electrodes is further configured to receive RF electrical potentials; and wherein at least one region along an ion optical path of the ion mobility spectrometer is arranged for storing the at least a fraction of the mobility-separated fragment ions.

3. A mass spectrometer according to claim 1, wherein the system of electrodes is configured to receive switched DC electrical potentials to transfer the at least a fraction of the mobility-separated fragment ions to the mass analyzer for generating the m/z spectrum.

4. A mass spectrometer according to claim 1, wherein the ion source for producing fragment ions comprises an RF ion trap.

5. A mass spectrometer according to claim 4, further comprising an RF multipole ion guide; wherein the mass spectrometer is arranged to eject ions from the RF ion trap, to re-trap the ejected ions within the RF multipole ion guide, and subsequently to gate the re-trapped ions into the ion mobility spectrometer.

6. A mass spectrometer according to claim 5, wherein the system of electrodes is configured to receive DC electrical potentials so as to raise the potential energy level of the ions stored in the RF multipole ion guide and simultaneously to raise the DC voltage gradient established across the ion mobility spectrometer that induces separation.

7. A mass spectrometer according to claim 1, wherein the at least a fraction of the mobility separated fragment ions is transmitted through the system of electrodes and sampled by a time-of-flight mass analyzer at the highest possible sampling rate.

8. A mass spectrometer according to claim 1, wherein the ion mobility spectrometer is configured to separate multiple fractions of the received fragment ions according to their ion mobility into mobility-separated fragment ions; and wherein the system of electrodes is configured to receive DC electrical potentials to transfer multiple fractions of the mobility-separated fragment ions to the mass analyzer for generating consecutive m/z spectra, with each m/z spectrum of the generated consecutive m/z spectra corresponding to one of the multiple fractions of mobility-separated fragment ions.

9. A mass spectrometer according to claim 1, wherein the system of electrodes of the ion mobility spectrometer is configured to receive a series of RF and DC electrical potentials for generating electric fields defining ion trapping regions disposed toward an exit end of the ion mobility spectrometer, for trapping the mobility-separated fragment ions thereat.

10. A mass spectrometer according to claim 9, wherein the system of electrodes is configured to receive at least one switched DC electrical potential from amongst the series of DC electrical potentials applied to the ion mobility spectrometer, for separating, partitioning or splitting the mobility-separated fragment ions into spatially separate groups.

11. A mass spectrometer according to claim 10, wherein the system of electrodes is configured to receive the at least one switched DC electrical potential applied to the ion mobility spectrometer to release the spatially separate groups of ions in temporally consecutive steps to permit the m/z spectra to be generated therefrom.

12. A mass spectrometer according to claim 10, wherein the system of electrodes is operable and configured such that to receive an electric field, which is applied to the ion mobility spectrometer to cause ion motion therealong and is reversible in direction to reverse the direction of ion motion to re-direct the spatially separate groups of fragment ions which are stored in the ion trapping regions of the ion mobility spectrometer in the upstream direction in a sequential manner for release from the ion mobility spectrometer.

13. A mass spectrometer according to claim 1, wherein a Bradbury-Nielsen gate is integrated with the system of electrodes and configured for transmitting a narrow m/z window of the mobility-separated fragment ions.

14. A mass spectrometer according to claim 1, wherein the system of electrodes is configured to receive RF and DC electrical potentials for transmitting the widest possible m/z range of the fragment ions.

15. A method for separating fragment ions in a mass spectrometer incorporating an ion mobility spectrometer, a system of electrodes, and a mass analyzer, the method comprising:
- receiving a population of fragment ions;
- separating, by the ion mobility spectrometer, the received population of fragment ions according to their ion mobility into mobility-separated fragment ions; and
- applying to the system of electrodes DC electrical potentials to transfer at least a fraction of the mobility-separated fragment ions to the mass analyzer for generating a mass-to-charge (m/z) spectrum exhibiting reduced spectral complexity to facilitate spectral interpretation.

16. A method comprising:
- generating a population of fragment ions in an ion trap;
- injecting the generated population of fragment ions into a pressurized ion mobility drift cell and separating the injected population of fragment ions inside the pressurized ion mobility drift cell;
- trapping at least a fraction of the separated population of fragment ions; and
- transferring the at least a fraction of trapped fragment ions towards a mass analyzer to produce at least one m/z spectrum containing reduced information compared to a m/z spectrum that includes the population of fragment ions.

17. The method of claim 16, wherein the ion trap is a RF linear ion trap.

\* \* \* \* \*